(12) United States Patent
Collins, Jr.

(10) Patent No.: US 8,068,600 B2
(45) Date of Patent: Nov. 29, 2011

(54) QUEUE MANAGEMENT SYSTEM AND METHOD

(75) Inventor: Donald A. Collins, Jr., Dawsonville, GA (US)

(73) Assignee: NCR Corporation

( * ) Notice: Subject to any disclaimer, the term of this patent is extended or adjusted under 35 U.S.C. 154(b) by 1486 days.

(21) Appl. No.: 10/862,806

(22) Filed: Jun. 7, 2004

(65) Prior Publication Data

US 2005/0271199 A1    Dec. 8, 2005

(51) Int. Cl.
*H04M 3/523*        (2006.01)
*H04B 5/04*         (2006.01)
*G06Q 10/00*        (2006.01)

(52) U.S. Cl. ......... 379/266.01; 455/41.3; 705/5; 705/15

(58) Field of Classification Search ............. 379/266.01, 379/266.02–266.06; 700/90; 705/5, 15; 455/403, 41.1–41.3
See application file for complete search history.

(56) References Cited

U.S. PATENT DOCUMENTS

| | | | | |
|---|---|---|---|---|
| 5,978,770 A * | 11/1999 | Waytena et al. | | 705/5 |
| 6,529,786 B1 * | 3/2003 | Sim | | 700/90 |
| 6,748,364 B1 * | 6/2004 | Waytena et al. | | 705/5 |
| 6,845,361 B1 * | 1/2005 | Dowling | | 705/5 |
| 7,069,228 B1 * | 6/2006 | Rose et al. | | 705/5 |
| 7,092,509 B1 * | 8/2006 | Mears et al. | | 379/266.01 |
| 7,133,659 B2 * | 11/2006 | Zalewski et al. | | 455/403 |
| 7,152,038 B2 * | 12/2006 | Murashita et al. | | 705/5 |
| 7,505,474 B2 * | 3/2009 | Walter | | 370/412 |
| 2002/0116235 A1 * | 8/2002 | Grimm et al. | | 705/5 |

* cited by examiner

*Primary Examiner* — Harry Hong
(74) *Attorney, Agent, or Firm* — Harden E. Stevens, III

(57) ABSTRACT

A queue management system and method which uses a computer to manage queue priorities and contact customers. The queue management system includes communication circuitry, and a processor for storing contact information of a customer in a list, for establishing a position of the customer in a queue, and for automatically causing the communication circuitry to wirelessly contact a personal communication device carried by the customer using the contact information if the position is first for service in the queue.

23 Claims, 2 Drawing Sheets

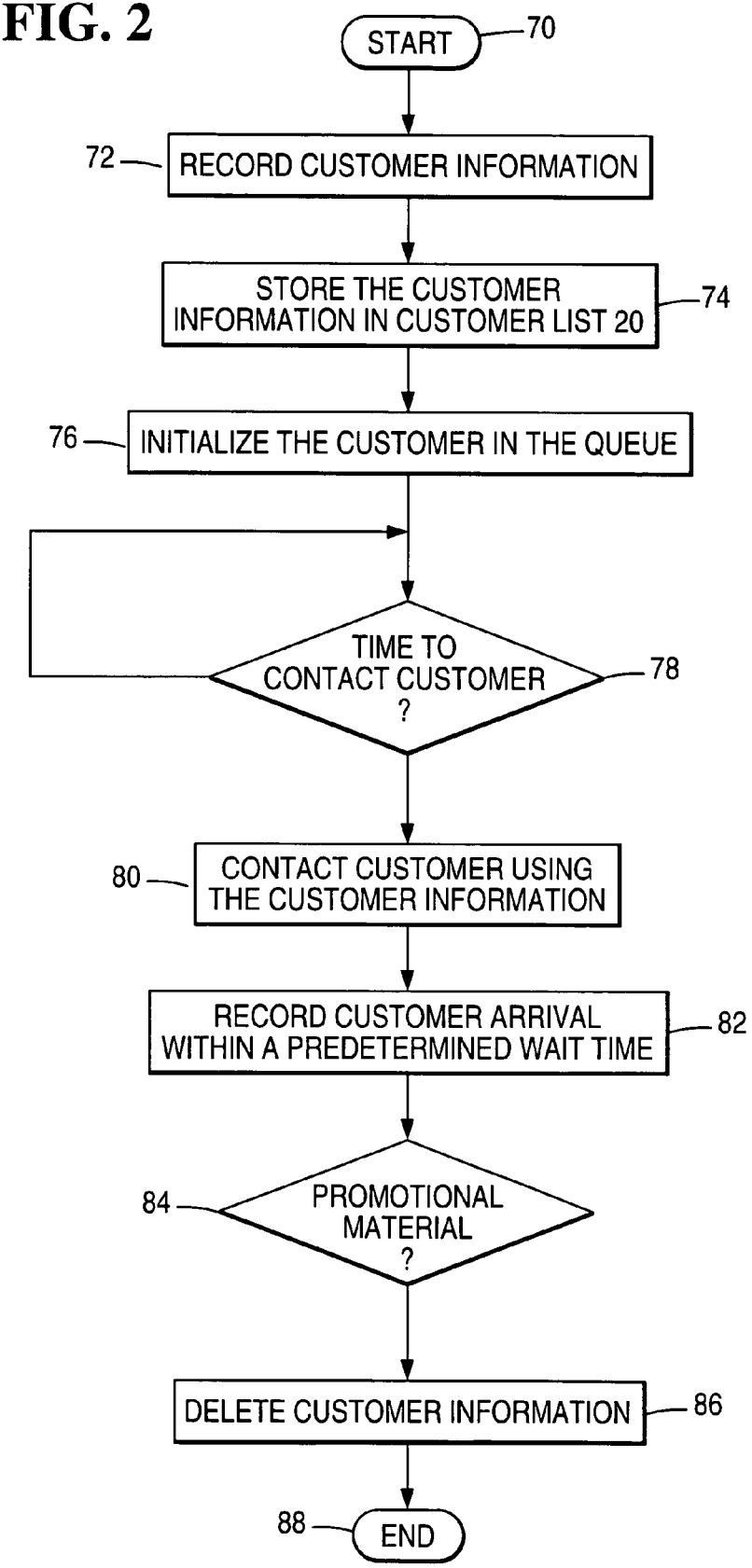

QUEUE MANAGEMENT SYSTEM AND METHOD

BACKGROUND OF THE INVENTION

The present invention relates to queuing methods and more specifically to a queue management system and method.

Much specialized hardware and much labor is required to man and manage a traditional sign-in and queue area. A typical example is a restaurant queue system in which a customer arrives at the sign-in station, leaves a name, and receives a beeper. Restaurant personnel activate the beeper after a table becomes vacant, thereby notifying the customer to return to check-in in order to be seated at the vacant table.

Therefore, it would be desirable to provide queue system that is more cost-effective.

SUMMARY OF THE INVENTION

In accordance with the teachings of the present invention, queue management system and method is provided.

The queue management system includes communication circuitry, and a processor for storing contact information of a customer in a list, for establishing a position of the customer in a queue, and for automatically causing the communication circuitry to wirelessly contact a personal communication device carried by the customer using the contact information if the position is first for service in the queue.

It is accordingly an object of the present invention to provide a queue management system and method.

It is another object of the present invention to provide a queue management system and method which avoid specialized hardware.

It is another object of the present invention to provide a queue management system and method which reduce customer wait time.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the queue method.

DETAILED DESCRIPTION OF THE PREFERRED EMBODIMENT

Figure 1:
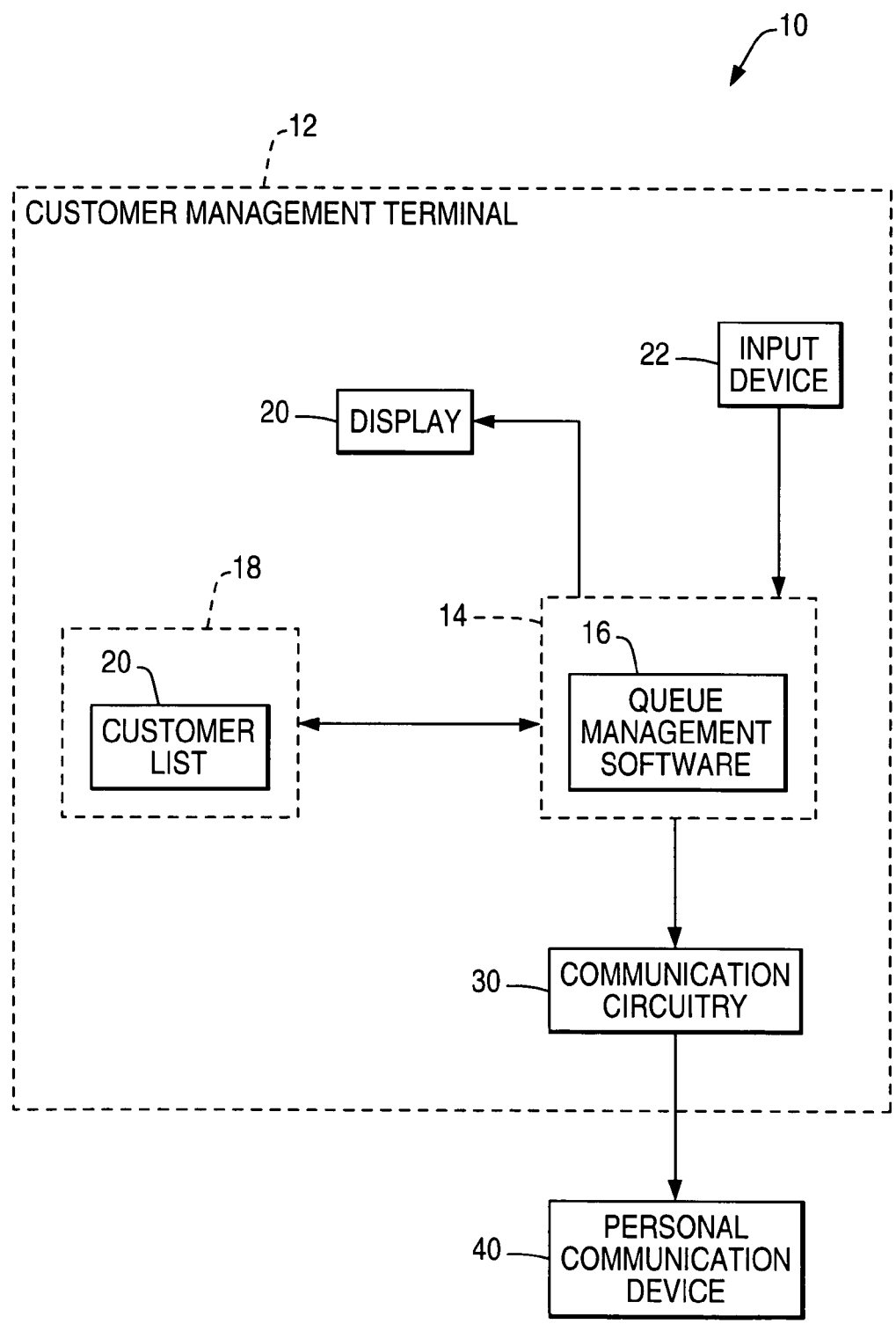
FIG. 1 is a block diagram of a queue system.

Referring now to FIG. 1, queue system 10 primarily includes customer management terminal 12 and personal communication device 40.

Customer management terminal 12 includes processor 14, storage medium 18, display 20, input device 22, and communication circuitry 30.

Customer management terminal 12 may include a personal computer, such as a self-service kiosk or an assisted service terminal. Customer management terminal 12 may also include a portable communication and computing device, such as a cellular phone, personal digital assistant, or Bluetooth standard devices.

Processor 14 executes queue management software 16. Queue management software 16 keeps track of customers and contacts them through communication circuitry 30 at the proper time. For this purpose, queue management software 16 maintains customer list 20 in storage medium 18.

Input device 22 facilitates entry of customer information into customer list 20.

Display 20 displays a user interface for entering and displaying customer information.

Communication circuitry 30 establishes communication with personal communication device 40. Communication circuitry 30 may include a cellular telephone or other wireless communication device, such as a Bluetooth standard communication device.

Personal communication device 40 may include a cellular telephone, pager, or other wireless communication device, such as a Bluetooth standard communication device.

With reference to FIG. 2, operation of queue management software 16 is illustrated in more detail beginning with START 70.

In step 72, queue management software 16 records customer information. Customer information may include a name, an arrival time, an address, and contact information, such as a telephone number, pager number, or email address. Customer information may also include a reservation time if service reservations are accepted.

In step 74, queue management software 16 stores the customer information in customer list 20 in order of arrival time.

In step 76, queue management software 16 initializes the customer in the queue. Queue management software 16 establishes priority of the customer based upon where the customer falls in customer list 20. Preferably, priority is based on a first come first serve basis, or based upon reservation time, if service reservations are accepted.

In step 78, queue management software 16 determines whether to contact the customer. Queue management software 16 runs through customer list 20 and reexamines the priority of the customer. If the customer has achieved a top priority or first in line position in customer list 20, or if the designated customer reservation time has been reached, operation proceeds to step 80. Otherwise, queue management software 16 continues to run through customer list 20 while the customer waits.

In step 80, queue management software 16 contacts the customer using the customer information in customer list 20. Queue management software 16 initiates a call by communication circuitry 30 to personal communication device 40.

In step 82, queue management software 16 records an indication that the customer has arrived within a predetermined wait time to accept service. If the customer were to not arrive within the predetermined wait time, the priority of the customer may continue at the same level or be readjusted as dictated by rules of the establishment.

In step 84, queue management software 16 determines through operator selection whether the customer would like to receive promotional material. If not, operation proceeds to step 86. Otherwise, queue management software 16 retains the customer information in customer list 20 and operation proceeds to step 88.

In step 86, queue management software 16 deletes the customer information from customer list 20.

In step 88, operation ends

Although the invention has been described with particular reference to certain preferred embodiments thereof, variations and modifications of the present invention can be effected within the spirit and scope of the following claims.

What is claimed is:

1. A queue management system comprising:
a self-service computer at a transaction establishment including
a display;
an input device;
communication circuitry; and
a processor for recording contact information entered by a walk-in customer at the transaction establishment using the input device, for storing the contact information in a list, for displaying the contact information to the walk-in customer using the display, for establishing a position of the walk-in customer in a queue, and for automatically causing the communication circuitry to wirelessly contact a personal communication device carried by the walk-in customer using the contact information if the position is first for service in the queue.

2. The system of claim 1, wherein the communication circuitry comprises a cellular telephone.

3. The system of claim 1, wherein the communication circuitry comprises a Bluetooth standard device.

4. The system of claim 1, wherein the communication circuitry comprises a pager.

5. The system of claim 1, wherein the contact information comprises a telephone number.

6. The system of claim 1, wherein the contact information comprises an email address.

7. A queue management system comprising:
  communication circuitry; and
  a self-service computer at a transaction establishment including an input device and a display;
  wherein the self-service computer is for recording contact information entered by a walk-in customer at the transaction establishment using the input device and an arrival time of the walk-in customer at the transaction establishment, for displaying the contact information to the walk-in customer using the display, for storing the contact information and the arrival time in a list, for establishing an initial position of the walk-in customer in a queue based upon the arrival time, for establishing subsequent positions of the walk-in customer as the queue changes, and for automatically causing the communication circuitry to wirelessly contact a personal communication device carried by the walk-in customer using the contact information if the walk-in customer reaches a first for service position in the queue.

8. The system of claim 7, wherein the self-service computer comprises a self-service kiosk.

9. The system of claim 7, wherein the self-service computer is also for storing a reservation time in the list and for establishing the initial position of the walk-in customer in the queue based upon the reservation time.

10. The system of claim 7, wherein the self-service computer is also for recording an indication that the walk-in customer has not arrived within a predetermined wait time to accept service, and for determining whether to change the priority of the walk-in customer in the queue.

11. The system of claim 7, wherein the self-service computer is also for determining whether the walk-in customer would like to receive promotional material, and for deleting the contact information from the list if the walk-in customer would not like to receive the promotional material.

12. A queue management method comprising the steps of:
  (a) recording contact information entered by a walk-in customer at a transaction establishment using an input device by a self-service computer;
  (b) displaying the contact information to the walk-in customer using a display by the self-service computer;
  (c) storing the contact information provided by the walk-in customer in a list by the self-service computer;
  (d) establishing a position of the walk-in customer in a queue by the self-service computer; and
  (e) automatically causing communication circuitry to wirelessly contact a personal communication device carried by the walk-in customer using the contact information if the position is first for service in the queue by the self-service computer.

13. The method of claim 12, wherein step (a) comprises the substep of:
  (a-1) recording a telephone number.

14. The method of claim 12, wherein step (a) comprises the substep of:
  (a-1) recording an email address.

15. The method of claim 12, wherein step (d) comprises the substep of:
  (d-1) establishing an initial position of the customer based upon an arrival time of the walk-in customer.

16. The method of claim 15, wherein step (d) further comprises the substep of:
  (d-2) establishing subsequent positions of the walk-in customer as the queue changes.

17. The method of claim 12, wherein step (e) comprises the substep of:
  (e-1) automatically causing communication circuitry to wirelessly contact a cellular telephone.

18. The method of claim 12, wherein step (e) comprises the substep of:
  (e-1) automatically causing communication circuitry to wirelessly contact a Bluetooth standard device.

19. The method of claim 12, wherein step (e) comprises the substep of:
  (e-1) automatically causing communication circuitry to wirelessly contact a pager.

20. A queue management method comprising the steps of:
  (a) recording contact information provided by a walk-in customer at a transaction establishment using an input device and an arrival time of the customer by a self-service computer;
  (b) displaying the contact information to the walk-in customer using a display by the self-service computer;
  (c) storing the contact information and the arrival time in a list by the self-service computer;
  (d) establishing an initial position of the walk-in customer in a queue based upon the arrival time at the transaction establishment by the self-service computer;
  (e) establishing subsequent positions of the walk-in customer as the queue changes by the self-service computer; and
  (f) automatically causing communication circuitry to wirelessly contact a personal communication device carried by the walk-in customer using the contact information if the walk-in customer reaches a first for service position in the queue by the self-service computer.

21. The method of claim 20, further comprising the steps of:
  (g) storing a reservation time in the list by the self-service computer; and
  (h) establishing the initial position of the walk-in customer in the queue based upon the reservation time by the self-service computer.

22. The method of claim 20, further comprising the steps of:
  (g) recording an indication that the walk-in customer has not arrived within a predetermined wait time to accept service by the self-service computer; and
  (h) determining whether to change the priority of the walk-in customer in the queue by the self-service computer.

23. The method of claim 20, further comprising the steps of:
  (g) determining whether the walk-in customer would like to receive promotional material by the self-service computer; and
  (h) deleting the contact information from the list if the walk-in customer would not like to receive the promotional material by the self-service computer.

* * * * *